United States Patent
Kopp et al.

(10) Patent No.: US 8,067,051 B2
(45) Date of Patent: Nov. 29, 2011

(54) PROCESS FOR MILLING COCOA SHELLS

(75) Inventors: Gabriele M. Kopp, Munich (DE); Stephen M. Pearson, Hohenbrunn (DE); Manoj Shah, Lindenhurst, IL (US)

(73) Assignee: Kraft Foods R & D, Inc., Northfield, IL (US)

(*) Notice: Subject to any disclaimer, the term of this patent is extended or adjusted under 35 U.S.C. 154(b) by 1164 days.

(21) Appl. No.: 11/425,016

(22) Filed: Jun. 19, 2006

(65) Prior Publication Data
US 2007/0292577 A1    Dec. 20, 2007

(51) Int. Cl.
*A23P 1/00* (2006.01)
(52) U.S. Cl. ......... 426/518; 426/631; 426/451; 426/533
(58) Field of Classification Search ................ 426/518, 426/631, 451, 533; 241/5, 39
See application file for complete search history.

(56) References Cited

U.S. PATENT DOCUMENTS

| | | | |
|---|---|---|---|
| 1,766,447 A | 6/1930 | Moir | |
| 1,989,415 A | 1/1935 | Hartman | |
| 2,390,678 A | 12/1945 | Andrews | |
| 2,464,212 A | 3/1949 | Carter et al. | |
| 3,392,027 A * | 7/1968 | Hess | 426/45 |
| 3,462,086 A | 8/1969 | Bertrand et al. | |
| 3,476,711 A | 11/1969 | Muller et al. | |
| 3,615,668 A | 10/1971 | Smith | |
| 3,734,413 A | 5/1973 | Kaiser | |
| 3,878,195 A | 4/1975 | Taillie et al. | |
| 3,964,175 A | 6/1976 | Sivetz | |
| 4,156,030 A | 5/1979 | Eggen | |
| 4,203,555 A | 5/1980 | Dickson, Jr. | |
| 4,281,027 A | 7/1981 | Inoue et al. | |
| 4,474,665 A * | 10/1984 | Green | 507/104 |
| 4,602,743 A | 7/1986 | Nied | |
| 4,698,916 A | 10/1987 | Farber | |
| 4,963,743 A | 10/1990 | Satake et al. | |
| 4,970,804 A | 11/1990 | Huttlin | |
| 4,973,481 A | 11/1990 | Hunt et al. | |
| 4,979,684 A | 12/1990 | Hoch et al. | |
| 4,988,590 A | 1/1991 | Price et al. | |
| 5,023,105 A | 6/1991 | Warseck | |
| 5,034,609 A | 7/1991 | Satake et al. | |
| 5,155,923 A | 10/1992 | Wireman et al. | |
| 5,230,281 A | 7/1993 | Wireman et al. | |

(Continued)

FOREIGN PATENT DOCUMENTS

DE    20313389 U1    11/2003

(Continued)

OTHER PUBLICATIONS

English Translation for EP 1591214, Nov. 2005.*

(Continued)

*Primary Examiner* — Anthony Weier
(74) *Attorney, Agent, or Firm* — Fitch, Even, Tabin & Flannery (57) ABSTRACT

A process for preparation of milled cocoa shell including grinding cocoa shell in a single unit operation in a short-duration manner without the need for moving mechanical parts. The milled cocoa shell product obtained from the grinding treatment has reduced heat degradation and avoids equipment maintenance concerns otherwise associated with mechanical milling of the cocoa shells while providing an edible granular product useful for food manufacture such as chocolate food production.

12 Claims, 4 Drawing Sheets

U.S. PATENT DOCUMENTS

| | | | |
|---|---|---|---|
| 5,236,132 A | 8/1993 | Rowley, Jr. | |
| 5,257,574 A | 11/1993 | Hiromichi | |
| 5,292,005 A | 3/1994 | Wireman et al. | |
| 5,307,733 A | 5/1994 | Enomoto | |
| 5,394,623 A | 3/1995 | Sewell | |
| 5,423,132 A | 6/1995 | Graber | |
| 5,436,023 A | 7/1995 | Avera | |
| 5,544,821 A | 8/1996 | Gupta et al. | |
| 5,567,048 A | 10/1996 | Hammonds | |
| 5,577,467 A | 11/1996 | Bormann | |
| 5,598,979 A | 2/1997 | Rowley, Jr. | |
| 5,604,994 A | 2/1997 | Annen et al. | |
| 5,609,097 A | 3/1997 | Newnan | |
| 5,616,356 A | 4/1997 | Buhler et al. | |
| 5,620,145 A | 4/1997 | Masuda | |
| 5,718,164 A | 2/1998 | Finken et al. | |
| 5,725,898 A | 3/1998 | Murphy et al. | |
| 5,791,066 A | 8/1998 | Crews | |
| 5,853,788 A | 12/1998 | Murphy et al. | |
| 5,855,326 A | 1/1999 | Beliavsky | |
| 5,899,391 A | 5/1999 | Goehner et al. | |
| 5,915,814 A | 6/1999 | Crews | |
| 5,958,494 A | 9/1999 | Tidland et al. | |
| 5,984,212 A | 11/1999 | Andreae-Jackering | |
| 6,135,370 A | 10/2000 | Arnold | |
| 6,145,765 A | 11/2000 | Capelle, Jr. et al. | |
| 6,227,473 B1 | 5/2001 | Arnold | |
| 6,270,708 B1 | 8/2001 | Gurol | |
| 6,326,045 B1 | 12/2001 | Rubio et al. | |
| 6,517,015 B2 | 2/2003 | Rowley, Jr. | |
| 6,530,534 B1 | 3/2003 | Farmer | |
| 6,564,470 B2 | 5/2003 | Krueger | |
| 6,589,589 B2 | 7/2003 | Whalen | |
| 6,607,768 B1 | 8/2003 | Eichner | |
| 6,971,594 B1 | 12/2005 | Polifka | |
| 7,156,331 B2 | 1/2007 | Takahashi et al. | |
| 7,207,504 B2 | 4/2007 | Willmot | |
| 2002/0022076 A1 | 2/2002 | Lanner et al. | |
| 2002/0027173 A1* | 3/2002 | Polifka | 241/5 |
| 2002/0046475 A1 | 4/2002 | Cho et al. | |
| 2003/0025010 A1 | 2/2003 | Ribardi | |
| 2003/0080224 A1 | 5/2003 | Rowley, Jr. | |
| 2003/0155454 A1 | 8/2003 | Beliavsky | |
| 2004/0182957 A1 | 9/2004 | Gomez | |
| 2005/0098669 A1 | 5/2005 | Polifka | |
| 2005/0132893 A1 | 6/2005 | Arora et al. | |
| 2006/0029703 A1 | 2/2006 | Shah et al. | |
| 2006/0040027 A1 | 2/2006 | Shah et al. | |
| 2006/0045951 A1 | 3/2006 | Shah et al. | |
| 2006/0083834 A1 | 4/2006 | Shah et al. | |
| 2006/0088634 A1 | 4/2006 | Shah et al. | |
| 2006/0270561 A1* | 11/2006 | Keim et al. | 504/366 |
| 2006/0286230 A1 | 12/2006 | Shah et al. | |
| 2006/0286232 A1* | 12/2006 | Shah et al. | 426/518 |
| 2006/0286246 A1 | 12/2006 | Shah et al. | |
| 2006/0286269 A1 | 12/2006 | Shah et al. | |

FOREIGN PATENT DOCUMENTS

| | | | |
|---|---|---|---|
| DE | 10253810 A1 | 5/2004 | |
| EP | 0 068 229 A1 | 1/1983 | |
| EP | 0 213 645 A1 | 3/1987 | |
| EP | 0 423 701 A2 | 4/1991 | |
| EP | 0 787 528 A1 | 8/1997 | |
| EP | 1110615 A1 | 6/2001 | |
| EP | 1 136 129 A1 | 9/2001 | |
| EP | 1 380 215 A2 | 1/2004 | |
| EP | 1591214 | * | 11/2005 |
| EP | 1733625 A1 | 12/2006 | |
| GB | 631027 A | 10/1949 | |
| GB | 930981 A | 7/1963 | |
| GB | 1029459 A | 5/1966 | |
| GB | 1048726 A | 11/1966 | |
| GB | 1196380 A | 6/1970 | |
| GB | 1243396 A | 8/1971 | |
| GB | 12433696 A | 8/1971 | |
| HU | 3017 A1 | 11/1985 | |
| JP | 55064757 A | 5/1980 | |
| JP | 59071660 A | 4/1984 | |
| JP | 61104748 A | 5/1986 | |
| JP | 3219837 A | 9/1991 | |
| JP | 3266965 A | 11/1991 | |
| JP | 3266966 A | 11/1991 | |
| JP | 4304872 A | 10/1992 | |
| JP | 5277927 A | 10/1993 | |
| JP | 7-31894 | * | 2/1995 |
| JP | 8-298959 | * | 11/1996 |
| JP | 8298959 A | 11/1996 | |
| JP | 2001149807 A | 6/2001 | |
| JP | 2003080297 A | 3/2003 | |
| SU | 1540777 | * | 2/1990 |
| SU | 1540777 A1 | 2/1990 | |
| WO | 98/51413 A1 | 11/1998 | |
| WO | 00/01256 A1 | 1/2000 | |
| WO | 00/56460 A1 | 9/2000 | |
| WO | 01/21316 A1 | 3/2001 | |
| WO | 03/006166 A1 | 1/2003 | |
| WO | 03/092898 A1 | 11/2003 | |
| WO | 2004/011850 A1 | 2/2004 | |
| WO | 2004/049825 A1 | 6/2004 | |
| WO | 2005/058073 A1 | 6/2005 | |

OTHER PUBLICATIONS

English Translation for JP 7-31894, Feb. 1995.*

English Translation for JP 8-298959, Nov. 1996.*

Görgens E., "Turbulence Comminution. Milling in Micro Vortex Mills." Database FSTA [Online] International Food Information Service (IFIS), vol. 41, No. 1997, p. 22. Frankfurt-Main, Germany, 2 pages.

Huslin, Anita., "A Mighty Wind Against Waste." Washington Post, Monday, Dec. 9, 2002, p. A01), a printout of: http://www.washingtonpost.com/ac2/wp-dyn?pagename=article&node=&contentID=A28285-2002Dec8&notFound=true, 6 pages, Feb. 16, 2004.

Lewis, Sarah, "Kansas Chicken Twisters." Engineers' Forum of Virginia Tech, a printout of: http://filebox.vt.edu/eng/forum/issue_archive/2003_2_april/12_chicken_twisters.htm, 2 pages, Nov. 13, 2003.

Garofalo, F., Wichita Eagle Newspaper Article, 1 page, undated.

European Search Report, European Patent Application No. 05 01 2964, date of completion of the search Dec. 2, 2005, 7 pages (corresponds to U.S. Appl. No. 11/425,016).

* cited by examiner

PROCESS FOR MILLING COCOA SHELLS

TECHNICAL FIELD

The invention generally relates to a process for milling cocoa shells without moving mechanical parts and the granular edible product thereof.

BACKGROUND ART

Cocoa beans or seeds of the cocoa tree fruit have an inner portion or nib which is covered by a naturally affixed shell. After being harvested, raw cocoa beans may be fermented for a few days so that biochemical changes may take place which aid in developing flavor, reduce bitterness, and darken the seeds. The beans then are dried and polished (cleaned). The shells are cracked (e.g., mechanically, via intense infrared heat treatment, etc.), and then are removed and separated ("winnowed") from the nibs. Typically, a small yet discernible portion of fractured nibs remain with the shell fraction after winnowing, as either attached to and/or loosely associated with the shell fragments. The cocoa beans may be pre-roasted before cracking and winnowing. Alternatively, the cocoa nibs may be separately roasted after winnowing. Roasting aids in developing flavor, aroma, and color in chocolate.

The cocoa nibs are a well-known source of cocoa butter and cake, and are processed in known manners to extract these and other nib components. The cocoa shells, however, also are a potentially valuable source of edible nutrients and dietary materials and contain cocoa nibs as the separation is not 100%. Cocoa shells contain, e.g., polyphenols (~1-2%), alkaloids such as theobromine (~1-2%), vitamins such as Vitamin D, minerals such as calcium and phosphorus, amino acids, as well as soluble and insoluble dietary fibers (~25-30%), etc. The cocoa shells themselves also include approximately 6% shell fat, as well as the cocoa fat content and other compounds associated with any small portion of nibs still attached to and/or otherwise accompanying the shell fraction after winnowing. Roasted shells have also been used for aroma extraction. Cocoa shells have been used in flavored beverages, cocoa and chocolate production, mulch and fertilizer, and in ruminant livestock feed, etc. The cocoa shell portion of the cocoa beans may comprise approximately twelve to fifteen percent of the overall bean weight. Thus, aggregate amounts of the shells in high volume cocoa bean processing facilities can become substantial.

The cocoa shells, after separation from the nibs, have been converted into particulated forms to aid further handling, storage, and re-use of the shell material. Conventional mechanical milling of cocoa shells generally employs moving parts to effect attrition of the cocoa shells. Currently applied shell milling systems, include, e.g., beater blade mills, pin mills, differential mills, etc. Cocoa shells are extremely abrasive, which makes them difficult to mill and increases wear on equipment parts that contact them. As a result, mechanical milling of the shells is extremely costly in terms of machine maintenance. Mechanical milling also tends to generate localized heat and uncontrolled "hot spots," as well as overall temperature increases, in the ground shell product. Intense or unduly elevated heat generated in the shells during mechanical milling destroys or degrades nutrients and other desirable components present in the cocoa shells. The localized and general heating in cocoa shells induced by mechanical milling thereof is generally uncontrollable. Also, as indicated, a small portion of the nibs clings to and/or otherwise remains loosely associated with the shell fragment fraction generated by the winnowing operation. The melted fat of this nib portion retained on the shells, together with the shells themselves, may block a conventional mechanical milling system. Therefore, product flavor management for mechanical-milled cocoa shells generally is not feasible. Substantial amounts of cocoa shells are left unmilled and are not re-used, and instead are handled as waste by-product.

Improved and new arrangements are needed for grinding cocoa shells on a commercial scale which reduces heat degradation effects on product and equipment maintenance costs. The invention addresses the above and other needs in an efficient and economically feasible manner.

SUMMARY OF THE INVENTION

This invention provides a process for milling cocoa shells into edible granular products without the need to use moving mechanical parts to induce shell attrition.

In one embodiment, a process is provided for preparing milled cocoa shells in which compressed air is introduced into a vortex processing apparatus. The apparatus may include an enclosure for generating a vortex therein that includes a truncated conical shaped section in which the air travels along a downward path through the enclosure including the conical section to a lower end thereof. Air reaching the lower end flows back up and exits the enclosure via an exhaust outlet. Cocoa shells are introduced into the vortex processing apparatus and are entrained in the introduced air traveling downward through the vortex processing apparatus. At least a portion of the cocoa shells are ground before reaching the lower discharge end. The milled shell product obtained using vortex processing in accordance with embodiments herein is in the form of a dry finely-divided, flowable powder or granular material. It is shelf-stable, and conveniently handled and stored.

In a further embodiment, additional edible ingredients optionally can be introduced into the vortex processing unit at the same time as the cocoa shells to provide a granular cocoa base type of product. For instance, various dry flowable particulate ingredients commonly used in cocoa or chocolate bases, such as sweeteners, cocoa powder and/or dairy solids, can be homogenously mixed and ground together with the cocoa shells in the vortex processing apparatus.

Since the cocoa shells are ground in the vortex processing apparatus without the shells being contacted with moving mechanical parts, mechanical stress on the milling equipment itself and thermal stress on the cocoa shells is significantly reduced or eliminated. The increased parts wear and associated high maintenance costs encountered in conventional milling arrangements used for cocoa shells are significantly reduced or avoided. Greater levels of particle size reduction may be achieved on cocoa shells in the present invention without wear on milling parts becoming a restricting factor.

In one embodiment, the granular cocoa shells obtained by the vortex processing treatment have an average particle size less than 1,000 µm, and may range from about 1 micron to about 1,000 µm. The granular cocoa shells particularly may have an average particle size of less than about 60 µm, more particularly less than about 30 µm, and even more particularly less than about <25 µm. The latter-mentioned particle size range is significantly finer than commercial cocoa powder derived from nibs. These fine particle sizes provide beneficial sensory properties, such as where it is intended or desired to use the milled cocoa shells as cocoa powder or cocoa solids replacement. It also aids in embodiments where nutrient extraction, or aroma extraction of roasted shells, is intended to be conducted on the milled cocoa shells. Higher extraction yields may be achieved due to the increased surface area of the finely milled material.

The nutrient and dietary content of cocoa shells is substantially preserved in the milled shells obtained using vortex processing in accordance with embodiments herein. The short-duration of the vortex milling operation (e.g., 2-10 seconds) and absence of localized heat generation during milling aids in preserving desirable nutritive and fictional aspects of the cocoa shells. Also, a low temperature or unheated compressed air may be introduced within the vortex process apparatus during shell treatment to minimize or avoid heat-induced degradation of nutrients in the shells during the grinding treatment. Alternatively, the cocoa shells may be treated with heated air in a controllable manner within the vortex processing apparatus effective to develop desired aroma compounds within the shell material during milling. This effect may be desired, e.g., where the milled cocoa shells are to be substituted for conventional cocoa powder derived from the nibs. In another embodiment, the compressed air may be chilled or cooled before introduction into the vortex processing apparatus. It may be desirable to use cooled air to aid in preserving valuable or useful components or compounds in the cocoa shell material that have greater sensitivity to increased thermal conditions.

The process of this invention is generally applicable to all types of cocoa shells without limitation. For instance, it may be applied to cocoa shells obtained from roasted or unroasted cocoa beans, or blends thereof. It also may be applied to shells obtained from fermented or unfermented cocoa beans, or blends thereof. However, depending on the ultimate usage intended for the granular cocoa shell product, it may be preferable to select certain types of cocoa shells for processing versus others. For instance, if the granular cocoa shell product is intended for use as an additive or ingredient in food product, roasted and/or fermented shells are preferred as they tend to have greater aroma, flavor and color development consistent with food applications. These applications may include extraction of aroma extracts from the milled cocoa shells. Alternatively, if it desired to isolate useful nutritive, medicinal and/or health-related compounds from the granular cocoa shell product, such as via all extraction process, it is preferable to use unfermented and/or unroasted cocoa shells as they tend to retain higher concentrations of certain natural compounds of interest in this regard.

The milled shell product, and particularly milled roasted shell product, has sensory and functional attributes suitable for preparation or flavoring of foods or beverages. For instance, the milled cocoa shell product itself, and/or aroma extracts obtained therefrom, may be used in making chocolate or chocolate compositions, and in the preparation of foods and beverages incorporating them. For instance, it may used as a substitute, partly or wholly, for cocoa powder and/or cocoa solids in confections such as chocolate; food products including chocolate compositions such as in the form of a bulk ingredient, fillings, enrobing coatings; and cocoa beverages.

The cocoa shells obtained using vortex processing in accordance with embodiments herein also are a source of valuable nutrients and dietary substances which can be extracted or otherwise isolated in concentrated form. For instance, cocoa shell constituents preserved in the milled shells, such as polyphenols (e.g., procyanidins), alkaloids such as theobromine, vitamins such as Vitamin D, fat of the shells (~6%), fat of the remaining nibs included in the cocoa shell fraction after winnowing, minerals such as calcium and phosphorus, amino acids, as well as soluble and insoluble dietary fibers, individually or as a mixture of these, may be isolated from the milled cocoa shells for use in a concentrate form. For instance, a concentrate form of a shell constituent may be used as a food preparation additive or ingredient, or in a dietary supplement or nutraceutical product, or as a pharmaceutical or medicinal agent or additive, etc.

BRIEF DESCRIPTION OF THE DRAWINGS

Other features and advantages of the invention will become apparent from the following detailed description of preferred embodiments of the invention with reference to the drawings, in which.

The features depicted in the figures are not necessarily drawn to scale. Similarly numbered elements in different figures represent similar components unless indicated otherwise.

DETAILED DESCRIPTION OF THE INVENTION

Preferred embodiments of the invention will be described below with specific reference to a unique process for preparing a milled cocoa shells suitable for use in the manufacture of food products, such as chocolate or chocolate containing products, without using or needing moving mechanical parts. As will be appreciated, this invention provides many advantages and benefits over conventional mechanical milling technologies used on cocoa shells, such as reduced equipment maintenance costs, improved product quality, increased process control over product characteristics, and reduced waste management needs.

For purposes herein, "granular" or "particulated" refer to a free-flowing mass of small discrete solid particles. For purposes herein, "milling" and "grinding" are used interchangeably and refer to crushing, pulverizing, abrading, wearing, or rubbing a particle to break it down into smaller particles and/or liberate smaller particles, and includes mechanisms involving contact between moving particles, and/or between a moving particle and a static surface. A "milled" or "ground" particle is the product of such a treatment. "Dry" or "low-moisture", as used interchangeably herein in the context of granular or particulated materials, means the material contains less than about 14 wt. % total moisture.

Figure 1:
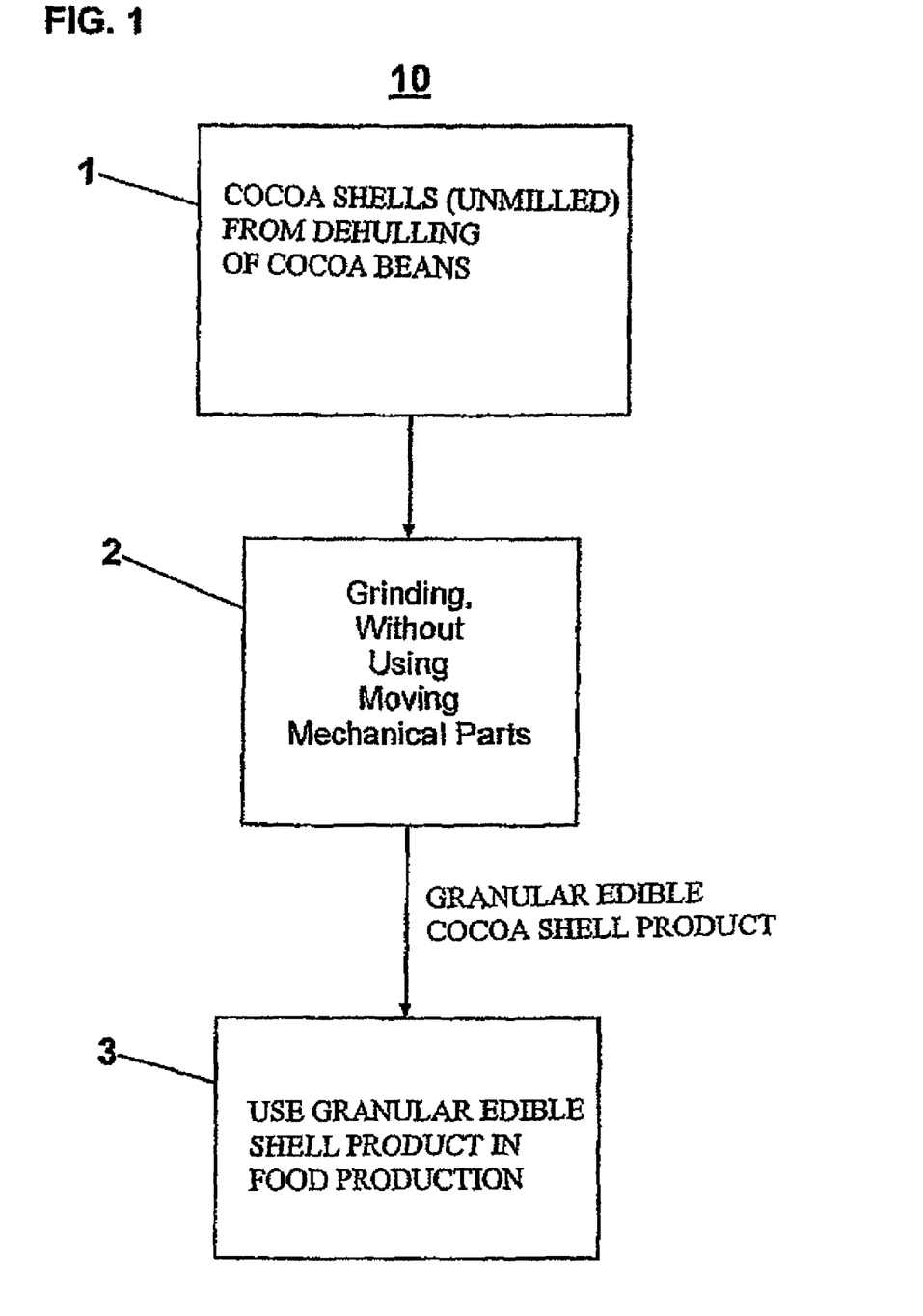
FIG. 1 is a flow chart of a method for processing cocoa shells, and optionally using the milled product thereof in food manufacture, according to an embodiment of this invention.

Referring to FIG. 1, in this non-limiting illustrated embodiment a process 10 is illustrated for the milling of cocoa shells in a system which does not use moving mechanical parts to cause attrition of the shells to a very fine powder or granular form. Cocoa shells are obtained (step 1), then the cocoa shells are subjected to a particle-size reducing grinding treatment to provide a granular cocoa shell material (step 2), and the resulting granular cocoa shell material product thereof is made available for optional use in food production or flavoring, or used as a viable source of useful flavor or health-related compounds that may be isolated therefrom (step 3).

Figure 2:
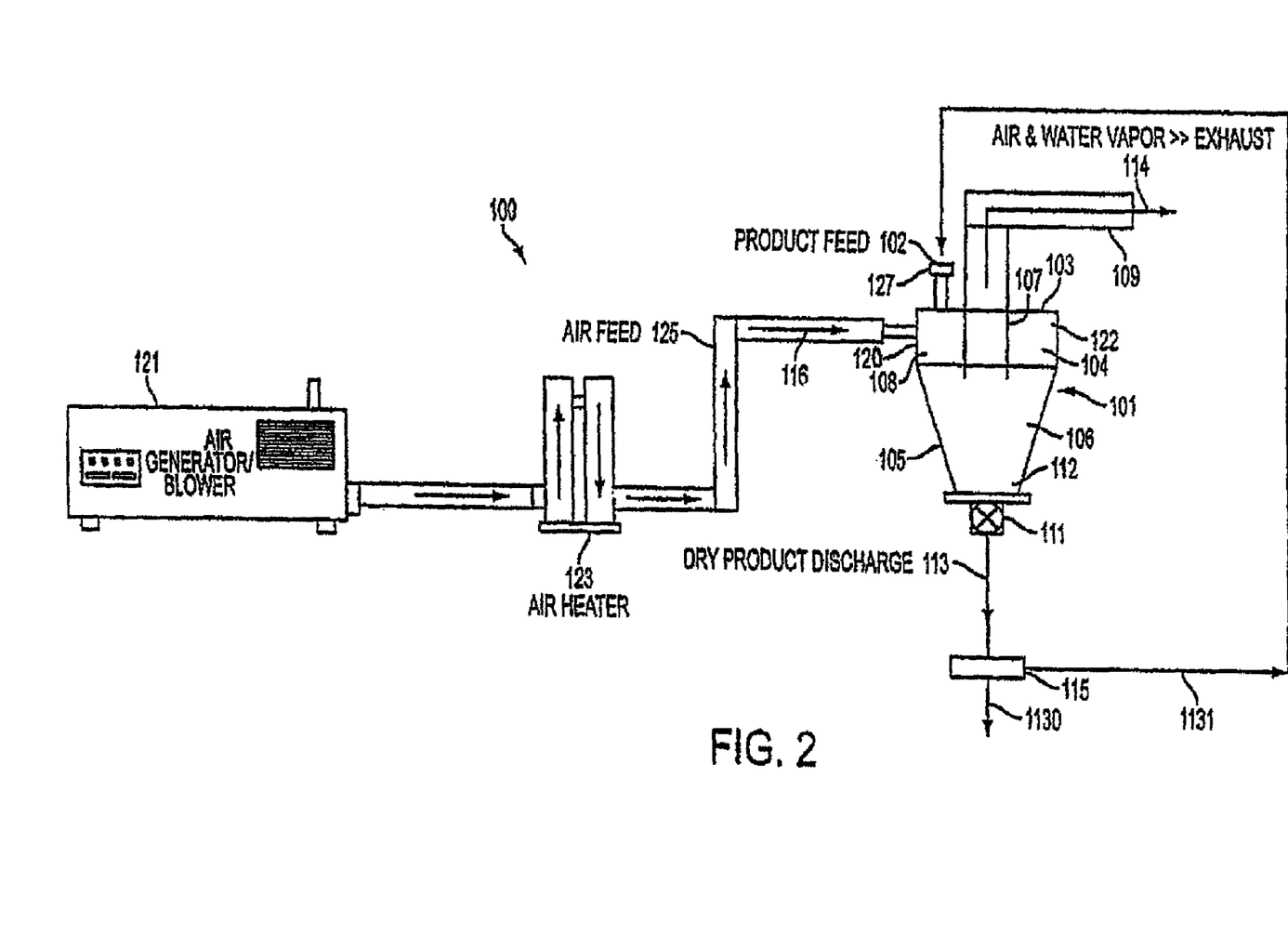
FIG. 2 is a schematic view of a system useful for producing milled cocoa shells according to an embodiment of this invention.
Figure 3:
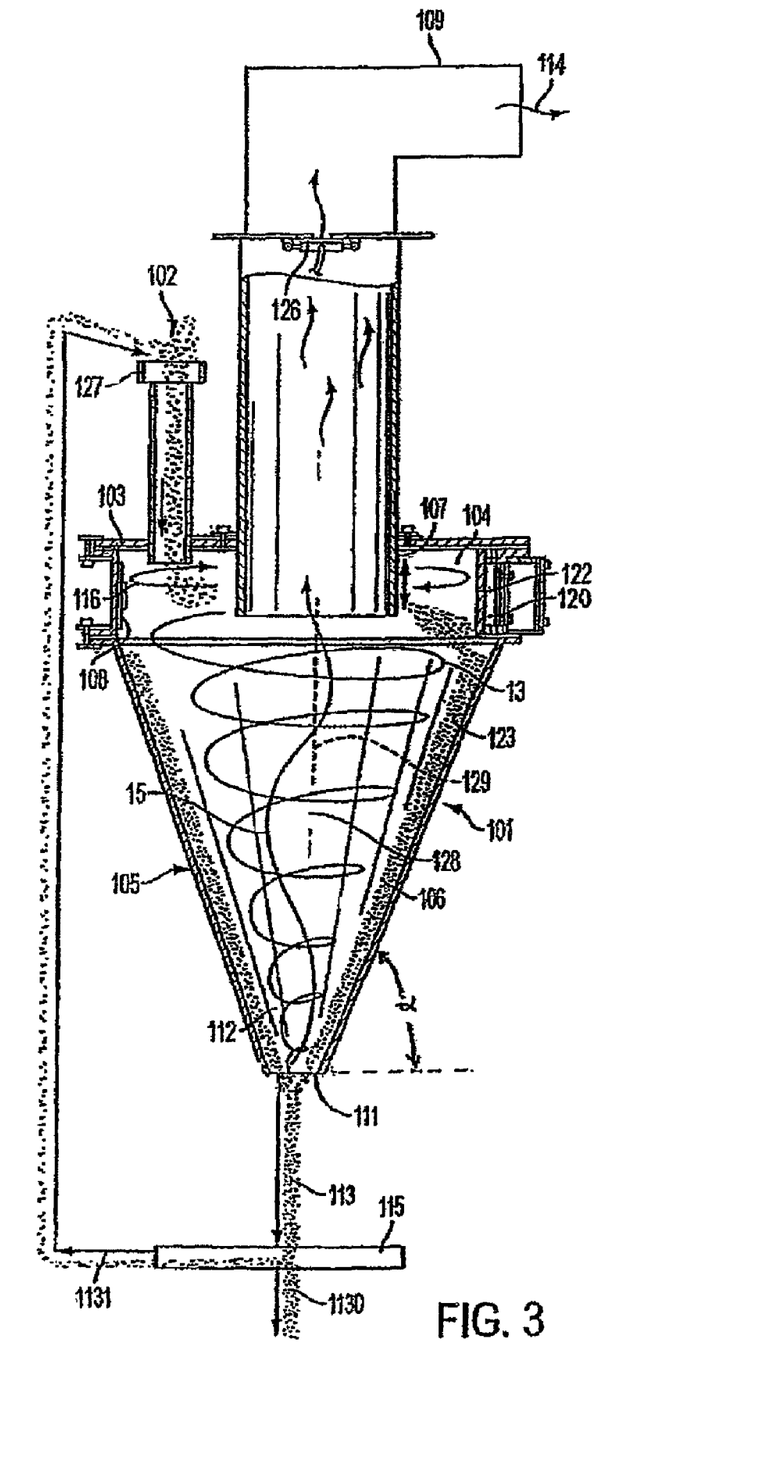
FIG. 3 is a cross sectional view of the cyclone unit used in the processing system illustrated in FIG. 2.
Figure 4:
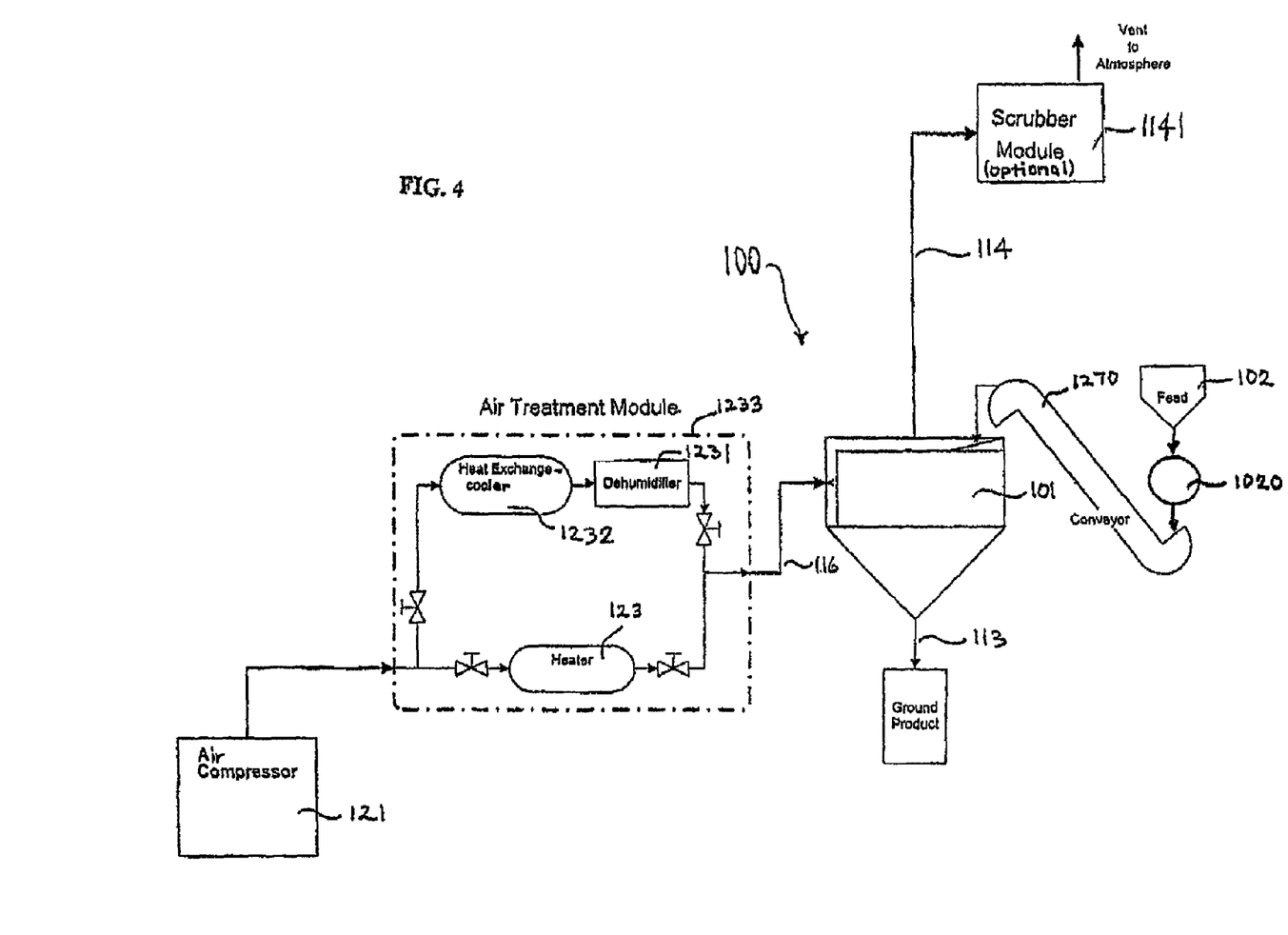
FIG. 4 is a schematic view of a system useful for producing milled cocoa shells according to another embodiment of this invention.

Referring now to FIGS. 2-4, details of an exemplary equipment arrangement and process of operating it for conducting the grinding of the cocoa shells, as indicated in step 2 in FIG. 1, is discussed hereinafter. Referring to FIG. 2, an exemplary system 100 for performing grinding of a feed 102 comprising cocoa shells according to a process embodiment of this invention is shown. Cyclone 101 is a structural enclosure comprised of two fluidly communicating sections: an upper cylindrical enclosure 103 defining a chamber 104; and a lower truncated conical shaped enclosure 105 that defines a cavity 106. Both the upper and lower enclosures are annular structures in which a solid wall or shell encloses an interior space. In this illustration, the upper enclosure 103 has a generally uniform cross-sectional diameter, while the lower enclosure 105 tapers inward towards its lower end 112. In a non-limiting embodiment, the taper angle α (alpha) of lower enclosure 105 may range from about 66 to about 70 degrees (see FIG. 3). For purposes herein, the terminology "enclosure" means a structure that encloses a chamber, cavity, or space from more than one side.

Compressed air 116 and cocoa shells 102 are separately introduced into the cyclone 101 at the upper enclosure 103. The processed cocoa shells are discharged as a solid particulate 113 from the lower end 112 of the cyclone 101 having a reduced particle size as compared to the cocoa shells fed into the processing unit. The solid particulate 113 is milled cocoa shells in this illustration. An optional valve mechanism 111, such as a rotary valve or rotary air-lock, is shown that permits extraction of dried, ground cocoa shell material from the cyclone without interrupting continuous operation of the system and which minimizes leakage of the introduced air from the cyclone 101. Alternatively, a hollow cylindrical extension shaft (not shown), optionally may be installed on the lower end 112 of the cyclone 101 to help direct granulated product into a receptacle or the like situated below the cyclone. In the absence of a valve mechanism at the lower end 112 of the cyclone 101, the pressurized air introduced into the cyclone also will escape from the cyclone 101 via opening 111 at the cyclone's lower end 112. This additional air loss may need to be compensated for in the inlet air feed rate to sustain a desired air pressure condition inside the cyclone, such as by increasing it sufficient to offset air loss occurring from both the bottom of the cyclone as well as the exhaust gas stream 114.

Air, and possibly some small amount of moisture vapor released from the cocoa shell feed during treatment within the cyclone 101, is exhausted as exhaust gases 114 from the cyclone via sleeve 107 and exhaust duct 109. Some nominal amount of light debris may be liberated from the feed during processing in the cyclone, and may be eliminated with the exhaust gas stream 114. The exhaust gas stream 114 optionally may be particle filtered, and/or scrubbed to strip out volatile compounds or other compounds, such as using a separate scrubber module, e.g. a packed bed type scrubber, before it is vented to the atmosphere (e.g., see FIG. 4, feature 1141). Sieving device 115 is described in more detail later herein.

To introduce the compressed air 116 into cyclone 101, an air pressurizing mechanism 121, such as a blower or air compressor, generates a high volume, high velocity compressed air stream that is conducted via air ducting 125 through an air treatment module, illustrated as a heating unit 123 in FIG. 2, and from there is introduced into upper enclosure 103 of cyclone 101. The compressed air 116 may be heated (FIG. 2), or alternatively it may be cooled to aid in preserving valuable components that may be heat-sensitive (FIG. 4), or may be left at ambient temperature (unheated) before introduction into the cyclone unit 101. For instance, an ambient or cooled low temperature (e.g., <about 30° C. (77° F.)) compressed air may be introduced within the vortex process apparatus during shell treatment to minimize or avoid heat-induced degradation of nutrients in the shells during the grinding treatment. Alternatively, the feed air may be heated in a controllable manner before introduction into the vortex processing apparatus effective to develop desired aroma compounds (e.g., roast aroma) within the cocoa shell material during milling. For purposes herein, the term "heated air" refers to air heated to a temperature above ambient temperature, e.g., above about 30° C. The term "compressed heat air" refers to air having both these characteristics. The term "cooled air" refers to air heated to a temperature below ambient temperature, and "compressed cooled air" refers to air having both these characteristics. The term "compressed air" refers to air compressed to a pressure above atmospheric pressure, e.g., above 760 mm Hg absolute (14.7 lb./inch$^2$ absolute).

The compressed air 116 is introduced into chamber 104 of cyclone 101 substantially tangentially to an inner wall 108 of the upper enclosure 103. This can be done, for example, by directing air stream 116 to a plurality of holes 120 (e.g., 2 to 8 holes) circumferentially spaced around and provided through the wall 108 of the upper enclosure 103 through which the compressed air stream is introduced. Deflection plates 122 can be mounted on inner wall 108 of upper enclosure 103 for deflecting the incoming stream of compressed air into a direction substantially tangential to the inner wall 108 according to an arrangement that has been described, for example, in U.S. patent application publication no. 2002/0027173 A1, which descriptions are incorporated herein by reference. The compressed air may be introduced into the upper enclosure 103 of cyclone 101 in a counter-clockwise or a clockwise direction.

The introduced air 10 generally may be further pressurized cyclonically in the chamber 104 and cavity 106. Due to the centrifugal forces present in the cyclonic environment, it is thought that the pressure nearer the outer extremities of the cavity 106 is substantially greater than atmospheric pressure, while the pressure nearer the central axis of the cavity 106 is less than atmospheric pressure. As shown in FIG. 3, as a non-limiting illustration, after being introduced into upper enclosure 103, the compressed air 116 spirals or otherwise travels generally along a large downward path as a vortex 13 through the upper enclosure 103 and the lower conical shaped enclosure 105 until it reaches a lower end 112 thereof. In this illustration, near the lower end 112 of the cavity 106 defined by the inner walls 123 of lower enclosure 105, the downward direction of the air movement is reversed, and the air (and any moisture vapor released from the food during treatment within the cyclone 101) whirls back upwardly as a smaller vortex 15 generally inside the larger vortex 13. The smaller vortex 15 flows back up from the lower end 112 of the lower enclosure 105 in a central region 128 located proximately near the central axis 129 of the cyclone 101 and generally inside the larger vortex 13. The smaller vortex 15 flows upward until exiting the enclosure via sleeve 107 and then exhaust duct 109.

A vortex breaking means (not shown) optionally can be interposed below or inside the lower end 112 to encourage the transition of the larger vortex 13 to the smaller vortex 15. Various vortex breaking arrangements for cyclones are known, such as the introduction of a box-shaped enclosure at the bottom of the conical enclosure, The cocoa shells 102 are separately introduced into upper enclosure 103. The introduced cocoa shells 102 drop gravitationally downward into chamber 104 until they become entrained in the air vortex 13 within cyclone 101. Preferably, the cocoa shells 102 are introduced into upper enclosure 103 in an orientation such that they will fall into the cyclonic vortex 13 generated within cyclone 101, where located in the space between the sleeve 107, and inner wall 108 of the upper enclosure 103. This feed technique serves to minimize the amount of cocoa shells 102 that may initially fall into extreme inner or outer radial portions of the vortex where the cyclonic forces that the food materials experience may be lower. The entrained cocoa shells travel in the vortex 13 of air spiraling or otherwise traveling downward through the lower enclosure 105 until reaching the lower end 112 of the lower enclosure 105. During this downward flow path, the grinding effects on the cocoa shell material may occur at different respective times and at different places during the downward flow path of the cocoa shell material through the cyclone.

While not desiring to be bound to any theory, it is thought that pressure-gradient and coriolis forces across, cavitation explosions, and the collision interaction between the cocoa shell pieces or particles entrained in the high-velocity cyclonically pressurized air may be violently disruptive to the physical structure of that cocoa shell material. Alternatively, or in addition thereto, the centrifugal force of the vortex may move the cocoa shell material forcefully against inner walls 108 and 123 of the enclosure. These modes of attrition, individually or in combination, or other modes of attrition that may occur within the cyclone which may not be fully understood, bring about comminuting (grinding) of the cocoa shells concurrent with any drying of them. As a result, during this movement of the cocoa shell material from the upper enclosure 103 down to the lower end 112 of the lower enclosure 105, the cocoa shell material is physically processed in beneficial ways. The unit 101 requires no mechanical moving parts for effecting grinding of the cocoa shell material.

In a further embodiment of the invention, the discharged solid particulate product 113 can be screened, such as using a sieve, such as a screen sieve or other suitable particulate separation/classifying mechanism 115, to sort and separate the finer fraction of ground cocoa shell material 1130 in the solid particulate product 113 that have particle sizes meeting a size criterion, such as being less than a predetermined size, which are suitable for post-grinding processing, from the coarser product fraction 1131. The coarser (oversize) product fraction 1131 optionally can be redirected into the upper enclosure of the cyclone for additional processing therein. A conveyor (not shown) could be used to mechanically transport the redirected coarser material back to feed introducing means 127 or other introduction means in upper enclosure 103 of cyclone 101. Also, feed introducing means 127 may be an inclined conveyor, screw feeder, etc. (e.g., see FIG. 4, feature 1270), which transports cocoa shell material 102 into chamber 104 of the cyclone 101 at the upper enclosure 103.

It will be appreciated that sleeve 107 can be controllably moved up and down to different vertical positions within cyclone 101. In general, the lower sleeve 107 is spaced relative to the cavity 106, the smaller the combined total volume of the cyclone 101 which is available for air circulation. Since the volume of air being introduced remains constant, this reduction in volume causes a faster flow of air, causing greater cyclonic effect throughout cavity 106 and consequently causing the food to be ground to circulate longer in the chamber 104 and the cavity 106. Raising the sleeve 107 generally has the opposite effect. For a given feed and operating conditions, the vertical position of sleeve 107 can be adjusted to improve process efficiency and yield.

Also, a damper 126 can be provided on exhaust duct 109 to control the volume of air permitted to escape from the central, low-pressure region of cavity 106 into the ambient atmosphere, which can affect the cyclonic velocities and force gradients within cyclone 101. Other than the optional damper, the unit 101 generally requires no moving parts for operation, and particularly with respect to effecting the grinding action which occurs within the unit.

By continually feeding a cocoa shell material 102 into cyclone 101, a continuous throughput of ground cocoa shell material 113 is obtained. A non-limiting example of a commercial apparatus that can be operated in a continuous manner according to processes of this invention is a WINDHEXE apparatus, manufactured by Vortex Dehydration Systems, LLC, Hanover Md., U.S.A. Descriptions of that type of apparatus are set forth in U.S. patent application publication no. 2002/0027173 A1, which descriptions are incorporated in their entirety herein by reference.

The cyclonic system 100 provides mechanical energy to further disintegrate and granulate the introduced cocoa shells. The ground cocoa shell material 113 (1130) exiting the cyclone 101 exhibits a flowable solid particulate type form, which may be a powdery material. In addition, meaningful and significant particle size reduction is effected upon the cocoa shell 102 in forming the granular cocoa shell material in cyclone 101 of system 100 without the need to contact the cocoa shells with any moving mechanical parts for that purpose, which reduces equipment needs, maintenance and cleaning requirements. The processing unit 101 may be left relatively clean and tidy, as the cocoa shell material does not tend to cling as residue to the interior walls of the process unit used to grind it into granular form. This can facilitate any desired change-over for processing a different type of feed material within the same unit.

In one process scheme for processing cocoa shells, the compressed air may be supplied to the cyclone at a pressure within the range of from about 0.7 $kg/cm^2$ to about 7 $kg/cm^2$ (about 10 psig to about 100 psig), particularly from about 2.8 $kg/cm^2$ to about 4.2 $kg/cm^2$ (about 40 psig to about 60 psig), and more particularly from about 3.2 $kg/cm^2$ to about 3.9 $kg/cm^2$ (about 45 psig to about 55 psig). The volumetric introduction rate of the compressed air into the cyclone is within the range of from about 850 $m^3/hr$ to about 17,000 $m^3/hr$ (about 500 cubic feet per minute (CFM) to about 10,000 CFM), about 1275 $m^3/hr$ to about 3,400 $m^3/hr$ particularly from (about 750 CFM to about 2,000 CFM), and more particularly from about 1360 $m^3/hr$ to about 2040 $m^3/hr$ (about 800 cubic feet per minute to about 1,200 cubic feet per minute). The feed rate of the cocoa shells can vary, but generally may be in the range of about 0.45 to 136 kg/min (about 1 to about 300 pounds per minute), particularly about 22.6 to about 68 kg/min (about 50 to about 150 lbs./min), for about a 0.3 to about 3 meter (1 to about 10 foot diameter) (maximum) cyclone. The cyclone diameter may be, for example, from about 0.3 to about 3 meters in diameter, particularly about 0.3 to about 1.8 meters in diameter.

The air temperature of the compressed air fed into the cyclone 101 generally may range between about 0° C. to 150° C. (32 to 302° F.), provided other temperature-related qualifications set forth herein are met. In one non-limiting process scheme for processing cocoa shells, the introduction of the compressed air into the cyclone 101 comprises supplying compressed heated air to the cyclone in a temperature effective to develop desired aroma compounds in the cocoa shells which compliment applications of the milled product for cocoa powder substitution. For this embodiment, the heated air generally is introduced into the cyclone at a temperature within the range of about 0° C. to about 150° C. (32° F. to 302° F.), particularly about 49° C. to about 135° C. (120° F. to 275° F.), more particularly about 121° C. to about 132° C. (250° F.

to 270° F.). As previously indicated, lower or higher process air temperatures may be desirable depending on the intended use of the cocoa shells.

At air temperatures below about 49° C. (120° F.), particularly at high ambient relative humidity conditions, the cocoa shells may tend to stick or clump inside the cyclone unless the compressed air is also dehumidified before it is introduced into the cyclone. As the air temperature is increased, the air generally has more water holding capacity and this scenario is more easily avoided. As indicated, if the air temperature is too high, the cocoa shells or desirable constituents thereof may become heat damaged or degraded.

The relatively short dwell time required to mill the cocoa shells within the vortex apparatus and relatively low process temperatures that can be used aids in preserving desirable nutritive and functional aspects of the cocoa shells. In one embodiment, upon introducing the cocoa shells into the cyclone, a granulated product thereof is discharged from the processing unit within about 15 seconds, particularly within about 2 to about 10 seconds, and more particularly within about 1 to about 5 seconds. Volatile components also may be handled by conducting the cyclone exhaust through a scrubber unit and the like after it exits the cyclone unit. Conventional milling generally employs moving parts to effect attrition of a material, which tends to generate localized heat. Intense or unduly elevated heat may increase the risk of degradation of desirable nutritive and/or food functional features of the cocoa shells.

The cocoa shells may be introduced into the cyclone 101 in a dry or wet (moist) condition. Preferably they are introduced in a dry state. In one embodiment, the cocoa shells used as the feed material of the grinding process generally contains from about 1 wt. % to about 14 wt. % moisture, particularly about 1 wt. % to about 8 wt. %, when introduced into the cyclone 101 of system 100. The ground cocoa shells obtained from the process generally contain about 1 wt. % to about 14 wt. % moisture content.

Referring to FIG. 4, the compressed air 116 may be preheated or precooled before introduction into the cyclonic processing unit 101. For example, in some applications it may be desirable to preserve certain heat-sensitive components or compounds present in the cocoa shells during processing in the vortex processing unit. As shown in FIG. 4, the system 100 permits routing of the compressed air through an air cooler 1232 adapted to lower the temperature of the compressed air before it is introduced into the cyclonic process unit 101. In one embodiment, the temperature of the compressed air is reduced using air cooler 1232 to a temperature below ambient air temperature (i.e., outside air temperature). For example, the compressed air may be reduced in temperature to about 10° C. (50° F.) or less, and particularly to about 4.5° C. (40° F.) or less, before introduction into the cyclonic processing unit.

As indicated, it may be necessary to dehumidify the compressed air before it is introduced into the cyclone unit in high relative humidity (RH) conditions (e.g. RH greater than about 50%) to ensure that the feed material ("cocoa shells") can be attrited into granular form and does not build-up into a sticky mass inside the cyclone. The air may be dehumidified using a conventional cooling coil unit or similar device used for dehumidification of process air (e.g., see FIG. 4, feature 1231). The dehumidifer or air dryer 1231 may be a commercial unit for the general purpose, e.g., a Model MDX 1000 air dryer from Motivair, Amherst, N.J. The dehumidifier 1231, cooler 1232, and heater 123 are units of a subsystem represented as air treatment module 1233 in FIG. 4. The air cooler 1232 may be a commercial or industrial heat exchanger unit, or a refrigeration unit or other suitable cooling device, e.g. a cooling unit capable of reducing the temperature of continuous flow process air to within about 6° C. (10° F.) of the coolant temperature. As indicated in FIG. 4, control valves and the like may be used to selectively control and manage air flow through the various air treatment units in module 1233.

A granular cocoa shell product obtained which can be stably stored and conveniently transported at ambient conditions, or may be used immediately in food manufacture or other uses or treatments. The milled shell product obtained is a finely divided powder or granular material. The granular cocoa shells have an average particle size in the range of about 1 micron to about 1,000 μm, particularly have an average particle size of less than about 60 μm, and more particularly have an average particle size of less than about 30 μm. As feed material, the cocoa shell may be supplied and used in varying discrete shapes such as fragments, pieces, shavings, particles, or a combination of these. In one embodiment, the cocoa shell feed material is in the form of fragments having an average maximum diameter size of about 0.5 mm to about 30 mm, particularly is about 1 mm to about 20 mm. As previously indicated, the cocoa shells generally will include some small portion of nibs clinging to and/or loosely accompanying them after winnowing. For purposes of this application, the term "cocoa shells" is understood to generally refer to such types of cocoa shell materials. Typical sizes of cocoa shell obtained directly from the winnowing machine are suitable for milling treatment in accordance with embodiments herein. A precomminution is not required.

The milled shell product has sensory and functional attributes suitable for food preparation, and it may be used as a food preparation additive, flavoring, or ingredient. It may be used in making chocolate or chocolate compositions, and in the preparation of foods and beverages incorporating them. For instance, it may used as a substitute, partly or wholly, for cocoa powder and/or cocoa solids in confections such as chocolate; food products including chocolate compositions such as in the form of a bulk ingredient, fillings, enrobing coatings; and cocoa beverages. The milled shells may be used in the same portion as available in a whole bean (12-15 percent) and mixed to cocoa powder or cocoa liquor (ground cocoa nibs). The cocoa shells also may be used directly as an individual ingredient in food preparation and production. The food products incorporating the milled cocoa shells may include, e.g., cookies, pastries, breakfast bars, snack bars, confections, and so forth. The milled shells also may be used in ruminant feeds or as a food filler. The milled cocoa shells also may be used in non-dietary applications, such as mulch and fertilizer.

The milled cocoa shells also are a source of valuable nutrients, aroma extracts and dietary substances. For instance, constituents thereof, which may be polyphenols such as procyanidins and/or others, alkaloids such as theobromine, vitamins such as vitamin D, minerals such as calcium and phosphorus, amino acids, fiber, cocoa fats, or a mixture of these, may be isolated from the milled cocoa shells and further used in a more concentrate form, such as a nutritional or dietary supplement or nutraceutical product. Polyphenols in general, and procyanidins in particular, have been reported to have utility as antioxidants, and as anti-cancer or antineoplastic agents, and so forth. Theobromine has known useful therapeutic or medicinal effects such as a diuretic or mild stimulant, etc. These compounds and other constituents and compounds of the milled cocoa shells also may have other beneficial effects and properties making it desirable to add them to foods via the milled cocoa shells, or separately as concentrate forms extracted from the milled cocoa shells.

In a further optional embodiment, additional edible ingredients are introduced into the vortex processing unit at the same time as the cocoa shells to provide a granular cocoa base type product. For instance, various dry flowable particulate ingredients commonly used in cocoa or chocolate bases, such as sweeteners and/or dairy solids or cocoa powder, can be homogenously mixed with the cocoa shells in the vortex processing apparatus. The sweetener preferably comprises a nutritive carbohydrate sweetener, and more preferably is a sugar, in the form of a dry powder. The dry powder may be crystalline. The sugar used may be, for example, sucrose, glucose, dextrose, lactose, fructose, invert sugar, corn syrup solids or sugar replacers such as polyols, e.g. sorbitol, mannitol, xylitol, maltitol, lactitol, polydextrose, etc., or mixtures thereof. Preferably, the sugar used is sucrose alone but, if desired, one or more other sugars may be used together with sucrose in a minor amount. If desired, a part of the sugar or sugar replacer may be replaced by a low calorie sweetening agent such as a sucralose, cyclamate, aspartame, nutrasweet, etc., or combinations thereof. The dairy solids may comprise, for example, whole milk powder, whey proteins, or low fat or nonfat milk solids. The low fat milk solids preferably contain less than 5% by weight of fats, more preferably less than 2% by weight of fats and are most preferably skimmed milk powder, or ingredients thereof or recombined dairy solids. Other edible dry powders, flours or particulates also may be admixed with the cocoa shells in this manner. These may include flavoring or functional additives or components.

The Examples that follow are intended to illustrate, and not limit, the invention. All percentages are by weight, unless indicated otherwise.

EXAMPLES

Example 1

Cocoa shells were processed in a vortex processing apparatus to evaluate the milling effects on the shells. Cocoa shells were obtained from winnowing roasted cocoa beans. The cocoa shells had a moisture content of approximately 6 wt. %.

The cocoa shells were introduced into a WINDHEXE apparatus for circular vortex air-flow material grinding. The WINDHEXE apparatus was manufactured by Vortex Dehydration Systems, LLC, Hanover, Md., U.S.A. The basic configuration of that type of apparatus is described in U.S. patent application publication no. 2002/0027173 A1, and reference is made thereto. The process unit had two inlet ports equidistantly spaced around the upper portion of the apparatus through which a compressed air stream was concurrently introduced in a counter-clockwise direction.

Testing was performed in a three-foot diameter WINDHEXE apparatus with compressed air introduced at 128EC (262° F.), air introduction rate of 1000 cubic feet per minute (CFM), and a pressure of 3.3 kg/cm² (47 psi) gauge. The diameter size refers to the chamber size of the enclosure into which cocoa shell introduction was made. The feed rate of the cocoa shells was set for an approximate discharge of approximately 0.45 kg (1 pound) solid product per minute. Cocoa shells were loaded into a hopper that directly fed a screw feeder that fed into the WINDHEXE apparatus. A flowable powder product stream was discharged from the bottom of the cyclone in about 2-10 seconds. The flowable powder was collected and analyzed for particle size distribution. The largest particle of the product was 45-50 µm, as measured with a micrometer screw. The product had a distinctive cocoa aroma.

While the invention has been particularly described with specific reference to particular process and product embodiments, it will be appreciated that various alterations, modifications and adaptations may be based on the present disclosure, and are intended to be within the spirit and scope of the present invention as defined by the following claims.

In particular, the features of all independent and dependent claims can be combined with each other, as long as they are not contradictory. Thus, all dependent claims can be considered to be dependent from any of the preceding claims.

The invention claimed is:

1. A process for milling cocoa shells, comprising:
introducing compressed air into an upper enclosure of a vortex processing apparatus having a lower enclosure with a lower discharge end and an upper exhaust outlet, the compressed air having an air temperature of between about 0° C. to about 150° C. and the compressed air introduced at a pressure between about 0.7 kg/cm² to about 7 kg/cm² and volumetric introduction rate at from about 850 m³/hr to about 17,000 m³/hr;
introducing cocoa shells into the upper enclosure of the vortex processing apparatus at a feed rate of about 0.45 to about 136 kg/min, wherein the cocoa shells are entrained in the introduced air and travel to the lower discharge end of the enclosure, wherein at least a portion of the cocoa shells are ground before reaching the lower discharge end and the shells travel in the air within the vortex processing apparatus without contacting a moving mechanical part;
discharging an edible granular cocoa shell product from the lower discharge end of the enclosure; and
selecting the feed rate of the cocoa shells and the pressure, temperature, and volumetric introduction rate of the compressed air so that the granular cocoa shell product is discharged from the lower discharge end within about 15 seconds and to avoid heat-induced degradation of nutrients in the shells, the edible granular cocoa shell product having an average particle size of less than about 60 µm.

2. The process of claim 1, wherein the granular cocoa shells have an average particle size of less than about 25 µm.

3. The process of claim 1, further comprising using the granular cocoa shell product as an ingredient in the making of a food product.

4. The process of claim 1, further comprising isolating a component from the granular cocoa shell product selected from the group consisting of aroma extract, polyphenols, alkaloid, vitamin, mineral, amino acid, fiber, shell fat, cocoa fat, or a combination of these.

5. The process of claim 1, wherein the introduced cocoa shells contain about 1 to about 14 wt. % total moisture.

6. The process of claim 1, wherein the introducing of the compressed air comprises supplying compressed air at a pressure within the range of from 2.8 kg/cm² to about 4.2 kg/cm².

7. The process of claim 1, wherein the introducing of the compressed air comprises supplying the compressed air at a temperature which causes no heat degradation to shell constituents during the milling.

8. The process of claim 1, wherein the introducing of the compressed air comprises supplying the compressed air at a heated temperature effective to develop desired aroma compounds within the cocoa shell material during the milling.

9. The process of claim 1, wherein the introducing of the compressed air comprises supplying the compressed air at a rate of within the range of from about 1275 m³/hr to about 3400 m³/hr.

10. The process of claim 1, wherein the introducing of the compressed air comprises supplying compressed air which has been cooled to a temperature below ambient temperature before introduction into the vortex processing apparatus.

11. The process of claim 1, further comprising introducing at least one edible dry ingredient selected from the group consisting of sweetener, cocoa powder and dairy solid into the vortex processing apparatus simultaneously with the introduction of the cocoa shells.

12. The process of claim 1, wherein the vortex processing apparatus comprises an upper enclosure and lower enclosure which fluidly communicate, wherein the upper enclosure has a generally cylindrical shape having a substantially constant diameter of about 0.3 to about 3 meters, and the lower enclosure comprises a truncated conical shape having a maximum diameter size which is substantially the same as the diameter of the cylindrical enclosure.

* * * * *